United States Patent
Fang

(10) Patent No.: US 9,933,600 B1
(45) Date of Patent: Apr. 3, 2018

(54) OPTICAL CAMERA LENS

(71) Applicant: Chunhuan Fang, Shenzhen (CN)

(72) Inventor: Chunhuan Fang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/416,520

(22) Filed: Jan. 26, 2017

(30) Foreign Application Priority Data

Dec. 14, 2016 (CN) .......................... 2016 1 1156274

(51) Int. Cl.
| | |
|---|---|
| *G02B 13/18* | (2006.01) |
| *G02B 9/60* | (2006.01) |
| *G02B 13/00* | (2006.01) |
| *G02B 5/00* | (2006.01) |
| *G02B 27/00* | (2006.01) |

(52) U.S. Cl.
CPC .......... *G02B 13/0045* (2013.01); *G02B 9/60* (2013.01); *G02B 5/005* (2013.01); *G02B 13/18* (2013.01); *G02B 27/0025* (2013.01)

(58) Field of Classification Search
CPC .. G02B 13/0045; G02B 9/60; G02B 27/0025; G02B 13/18; G02B 5/005
USPC .......................... 359/714, 739, 740, 763, 764
See application file for complete search history.

(56) References Cited

U.S. PATENT DOCUMENTS

| | | | | |
|---|---|---|---|---|
| 2014/0118613 A1* | 5/2014 | Chang | ................ | G02B 13/0045 359/764 |
| 2014/0253796 A1* | 9/2014 | Chang | ................ | G02B 13/0045 359/764 |
| 2015/0092285 A1* | 4/2015 | Ishizaka | ............. | G02B 13/0045 359/714 |
| 2015/0098011 A1* | 4/2015 | Huang | ............... | G02B 13/0045 359/714 |
| 2015/0146306 A1* | 5/2015 | Yonezawa | .......... | G02B 13/0045 359/714 |
| 2015/0212297 A1* | 7/2015 | Chen | .................. | G02B 13/0045 359/714 |
| 2015/0253537 A1* | 9/2015 | Ye | ............................ | G02B 9/60 359/763 |

* cited by examiner

*Primary Examiner* — Evelyn A Lester
(74) *Attorney, Agent, or Firm* — Na Xu; IPro, PLLC

(57) ABSTRACT

The present disclosure provides an optical camera lens, which includes: an aperture, a first lens having positive refraction power, a second lens having negative refraction power, a third lens having positive refraction power, a fourth lens having positive refraction power, and a fifth lens having negative refraction power; a combined focal length of the first lens and the second lens is f12, a focal length of the third lens is f3, a total track length of the integral optical camera lens is TTL, an image height of the integral optical camera lens is IH, curvature radii of the object-side surface and the image-side surface of the third lens is r5 and r6, respectively, which satisfy the following relational expressions: $53<f3/f12<68$; $TTL/IH<1.4$; $0.95<r5/r6<1.1$; $f3>200$. The optical camera lens provided by the present disclosure can satisfy the needs on low TTL and wide angle, meanwhile reducing sensitivity of the component.

4 Claims, 8 Drawing Sheets

OPTICAL CAMERA LENS

TECHNICAL FIELD

The present disclosure relates to the field of optical lens and, particularly, relates to an optical camera lens adapted for portable terminal devices such as smart cellphone, digital camera etc. and for camera devices such as monitor, PC lens etc.

BACKGROUND

In recent years, as the booming development of the smart cellphone, the need on miniaturized camera lens is increasing gradually. However, the photosensitive component of a conventional camera lens is either a charge coupled device (Charge Coupled Device, CCD) or a complementary metallic-oxide semiconductor sensor (Complementary Metal-Oxide Semiconductor Sensor, CMOS Sensor). With the development of semiconductor processing technique, pixel size of the photosensitive component is reduced. In addition, the electronic product at present is developed to have better functions and a lighter and thinner configuration. Therefore, a miniaturized camera lens with better imaging quality has already become the mainstream in the current market.

In order to obtain better imaging quality, a traditional lens carried in a cellphone camera usually adopts a three-lens or four-lens structure. As the development of technologies and increasing of user's diversified needs, in the situation of the pixel area of the photosensitive component being reduced, and the requirements of the system on imaging quality being increased constantly, a five-lens structure appears in the lens design gradually. However, although the five-lens structure can eliminate major aberration, but cannot achieve the design requirements on low total track length (Total Track Length, TTL), wide angle and low sensitivity at the same time.

DESCRIPTION OF EMBODIMENTS

In order to make objectives, technical solutions and advantages of the present disclosure more clearly, embodiments of the present disclosure will be illustrated in detail with reference to the accompanying drawings. Those skilled in the art should understand, in each implementing manner of the present disclosure, in order to make the reader understand the present disclosure, a plurality of technical details have been proposed. However, the technical solutions protected by the present disclosure shall also be implemented without these technical details and the various modifications and variations presented in the embodiments.

Figure 1:
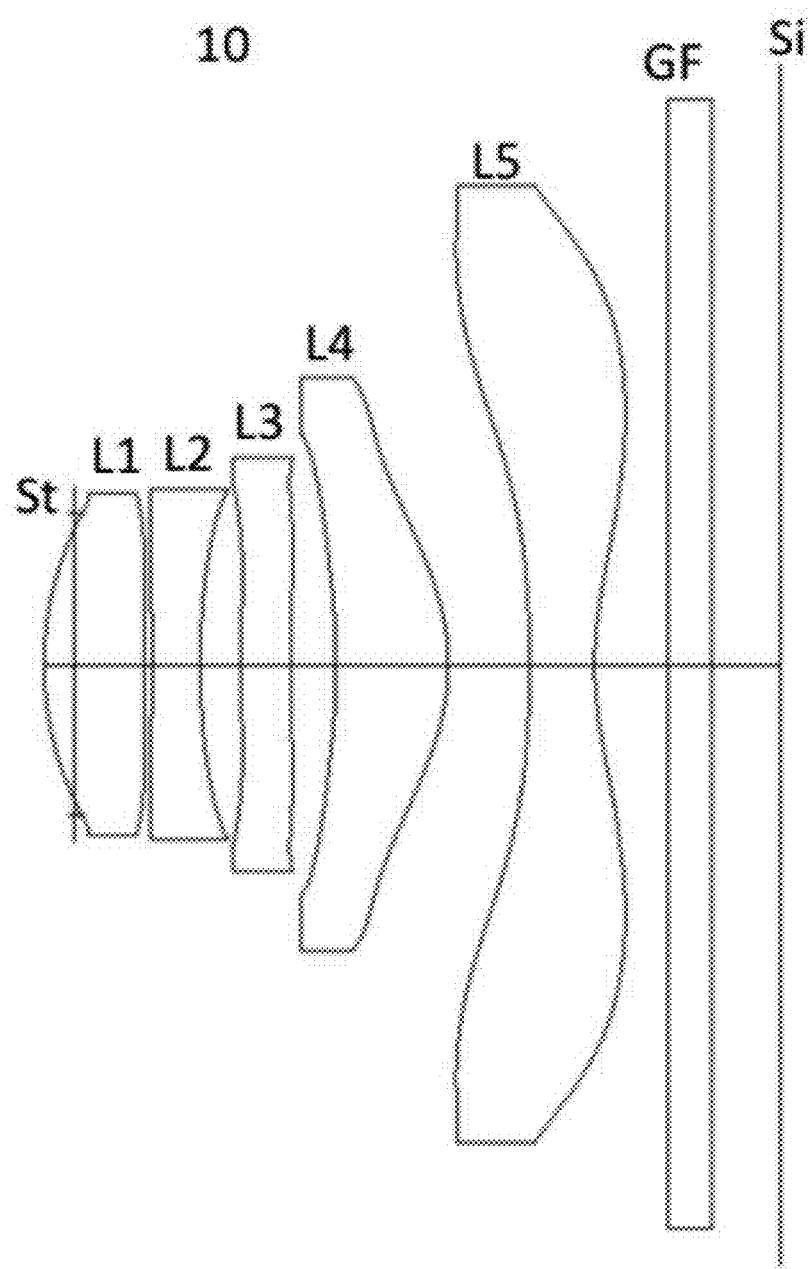
FIG. 1 is a structural schematic diagram of an optical camera lens according to an exemplary embodiment of the present disclosure.

Referring to the figures, the present disclosure provides an optical camera lens. FIG. 1 shows an optical camera lens 10 according to an exemplary embodiment of the present disclosure, the optical camera lens 10 includes five lenses. Specifically, the optical camera lens 10, from the object side to the image side, successively includes: an aperture St, a first lens L1, a second lens L2, a third lens L3, a fourth lens L4 and a fifth lens L5. An optical component such as an optical filter GF can be arranged between the fifth lens L5 and an imaging surface Si.

The first lens L1 has positive refraction power, an object-side surface thereof bulges outward to be a convex surface, which provides partial refraction power required by the optical camera lens system, an aperture St is arranged between the object and the first lens L1. The second lens L2 has negative refraction power, in the present embodiment, an image-side surface of the second lens L2 is a concave surface. The third lens L3 has positive refraction power, in the present embodiment, an image-side surface of the third lens L3 is a convex surface. The fourth lens L4 has positive refraction power, in the present embodiment, an image-side surface of the fourth lens L4 is a concave surface. The fifth lens L5 has negative refraction power, in the present embodiment, an object-side surface of the fifth lens L5 is a concave surface.

Herein, a combined focal length of the first lens and the second lens is f12, a focal length of the third lens is f3, a total track length of the integral optical camera lens is TTL, an image height of the integral optical camera lens is IH, a curvature radius of the object-side surface of the third lens is r5, a curvature radius of the image-side surface of the third lens is r6. The f12, f3, TTL, IH, r5 and r6 satisfy the following relational expressions: $53<f3/f12<68$; $TTL/IH<1.4$; $0.95<r5/r6<1.1$; $f3>200$.

The TTL and IH of the optical camera lens are set to be $TTL/IH<1.4$, which can achieve wide angle design of the optical camera lens, and reduce the total track length of the optical system; the foal length of the third lens is designed to be larger than 200 (mm), which is advantageous to reduce the sensitivity of the optical camera lens. The proportional relation of the curvature radius of the object-side surface and the image-side surface of the third lens is designed to be: $0.95<r5/r6<1.1$, which is advantageous to correct spherical aberration of the optical camera lens.

When the focal lengths of the optical camera lens 10, the TTL and the image height meet the above relational expressions, the refraction power configuration of each lens can be controlled/adjusted, which can correct aberration so as to guarantee imaging quality and, at the same time, satisfy the needs on low TTL and wide angle, meanwhile reducing sensitivity of the component.

Specifically, in an embodiment of the present disclosure, the focal length f1 of the first lens, the focal length f2 of the second lens, the focal length f3 of the third lens, the focal length f4 of the fourth lens and the focal length f5 of the fifth lens can be designed so as to satisfy the following relational expressions: $2<f1<3$; $-4<f2<-6$; $f3>200$; $2<f4<3$; $-1<f5<-2$, unit: millimeter (mm). Such a design can further shorten the total track length TLL of the integral optical camera lens 10, so as to maintain the characteristics of miniaturization.

In the optical camera lens 10 of the present disclosure, each lens can be made of glass or plastic, if the lens is made of glass, which can increase the freedom of the refraction power configuration of the optical system of the present disclosure, if the lens is made of plastic, which can effectively reduce production cost.

In an embodiment of the present disclosure, all lenses are plastic lenses. Further, in a preferred embodiment of the present disclosure, a refractive index n1 of the first lens, a refractive index n2 of the second lens, a refractive index n3 of the third lens, a refractive index n4 of the fourth lens and a refractive index n5 of the fifth lens satisfy following conditional expressions: $1.50<n1<1.55$, $1.50<n2<1.55$, $1.50<n3<1.55$, $1.60<n4<1.70$, $1.60<n5<1.70$. Such a design is advantageous for an appropriate matching of the lenses with material, so that the optical camera lens 10 can obtain better imaging quality.

It should be noted that, in an embodiment of the present disclosure, an abbe number v1 of the first lens, an abbe number v2 of the second lens, an abbe number v3 of the third lens, an abbe number v4 of the fourth lens and an abbe number v5 of the fifth lens can be designed to satisfy the following relational expressions: $40<v1<60$, $15<v2<30$, $15<v3<30$, $40<v4<60$, $40<v5<60$. Such a design can suppress the phenomenon of optical chromatic aberration during imaging by the optical camera lens 10.

Besides, the surface of the lens can be an aspheric surface, the aspheric surface can be easily made into shapes other than spherical surface, so as to obtain more controlling varieties, which are used to eliminate aberration so as to reduce the number of the lens used, thereby can effectively reduce the total length of the optical camera lens of the present disclosure. In an embodiment of the present disclosure, the surfaces of all the lenses are aspheric surfaces.

Optionally, an inflection point and/or a stationary point can be provided on the object-side surface and/or the image-side surface of the lens, so as to satisfy the imaging needs on high quality, the specific implementing solution is as follows.

The design data of the optical camera lens 10 according to Embodiment 1 of the present disclosure is shown as follows.

Table 1 and Table 2 show data of the lens in the optical camera lens 10 according to Embodiment 1 of the present disclosure.

TABLE 1

| Focal length (mm) | |
| --- | --- |
| f | 2.921622 |
| f1 | 2.28935 |
| f2 | −4.30556 |
| f3 | 268.6947 |
| f4 | 2.047132 |
| f5 | −1.79932 |
| f12 | 3.969833 | in which, meaning of each symbol is as follows.

f: focal length of the optical camera lens 10;

f1: focal length of the first lens L1;

f2: focal length of the second lens L2;

f3: focal length of the third lens L3;

f4: focal length of the fourth lens L4;

f5: focal length of the fifth lens L5;

f12: combined focal length of the first lens L1 and the second lens L2.

TABLE 2

| | | Curvature radius (R) (mm) | Thickness/ distance (d) (mm) | | Sagittal height (SAG) | Semi-diameter (SD) | Refractive index (nd) | | Abbe number (vd) | |
| --- | --- | --- | --- | --- | --- | --- | --- | --- | --- | --- |
| St | St | ∞ | d0 = | −0.153 | | | | | | |
| L1 | R1 | 1.28415 | d1 = | 0.492 | SAG11  0.216 | 0.726 | nd1 | 1.5441 | v1 | 56.12 |
| | R2 | −41.80925 | d2 = | 0.033 | SAG12 −0.042 | 0.759 | | | | |
| L2 | R3 | −21.47538 | d3 = | 0.237 | SAG21 −0.004 | 0.763 | nd2 | 1.6510 | v2 | 21.51 |
| | R4 | 3.27843 | d4 = | 0.196 | SAG22  0.137 | 0.776 | | | | |
| L3 | R5 | 5.18436 | d5 = | 0.241 | SAG31 −0.041 | 0.802 | nd3 | 1.6510 | v3 | 21.51 |
| | R6 | 5.24248 | d6 = | 0.222 | SAG32  0.011 | 0.918 | | | | |
| L4 | R7 | −2.84601 | d7 = | 0.548 | SAG41 −0.168 | 1.018 | nd4 | 1.5441 | v4 | 56.12 |
| | R8 | −0.85760 | d8 = | 0.397 | SAG42 −0.469 | 1.272 | | | | |
| L5 | R9 | −4.69230 | d9 = | 0.315 | SAG51 −0.357 | 1.889 | nd5 | 1.5441 | v5 | 56.12 |
| | R10 | 1.27325 | d10 = | 0.360 | SAG52 −0.292 | 2.121 | | | | |
| GF | R11 | ∞ | d11 = | 0.210 | | | nd6 | 1.5168 | v6 | 64.17 |
| | R12 | ∞ | d12 = | 0.337 | | | | | | |

R1, R2 are the object-side surface and the image-side surface of the first lens L1, respectively; R3, R4 are the object-side surface and the image-side surface of the second lens L2, respectively; R5, R6 are the object-side surface and the image-side surface of the third lens L3, respectively; R7, R8 are the object-side surface and the image-side surface of the fourth lens L4, respectively; R9, R10 are the object-side surface and the image-side surface of the fifth lens L5, respectively; R11, R12 are the object-side surface and the image-side surface of the optical filter GF, respectively. Meanings of other symbols are as follows.

d0: axial distance from the aperture St to the object-side surface of the first lens L1;

d1: axial thickness of the first lens L1;

d2: axial distance from the image-side surface of the first lens L1 to the object-side surface of the second lens L2;

d3: axial thickness of the second lens L2;

d4: axial distance from the image-side surface of the second lens L2 to the object-side surface of the third lens L3;

d5: axial thickness of the third lens L3;

d6: axial distance from the image-side surface of the third lens L3 to the object-side surface of the fourth lens L4;

d7: axial thickness of the fourth lens L4;

d8: axial distance from the image-side surface of the fourth lens L4 to the object-side surface of the fifth lens L5;

d9: axial thickness of the fifth lens L5;

d10: axial distance from the image-side surface of the fifth lens L5 to the object-side surface of the sixth lens L6;

d11: axial thickness of the optical filter GF;

d12: axial distance from the image-side surface of the optical filter GF to the imaging surface;

SAG: sagittal height, vertical distance between topmost point and bottommost point of the lens;

SAG11: sagittal height of the surface R1 of the first lens L1;

SAG12: sagittal height of the surface R2 of the first lens L1;

SAG21: sagittal height of the surface R3 of the second lens L2;

SAG22: sagittal height of the surface R4 of the second lens L2;

SAG31: sagittal height of the surface R5 of the third lens L3;

SAG32: sagittal height of the surface R6 of the third lens L3;

SAG41: sagittal height of the surface R7 of the fourth lens L4;

SAG42: sagittal height of the surface R8 of the fourth lens L4;

SAG51: sagittal height of the surface R9 of the fifth lens L5;

SAG52: sagittal height of the surface R10 of the fifth lens L5;

SD: semi-diameter parameter of the lens surface;

nd1: refractive index of the first lens L1;

nd2: refractive index of the second lens L2;

nd3: refractive index of the third lens L3;

nd4: refractive index of the fourth lens L4;

nd5: refractive index of the fifth lens L5;

nd6: refractive index of the optical filter GF;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the optical filter GF.

In the Embodiment 1 of the present disclosure, the distance from the image-side surface of the fifth lens L5 to the imaging surface Si is 0.907 mm, the TTL of the optical camera lens 10 is 3.588 mm.

Table 3 shows aspheric surface data of each lens in the optical camera lens 10 according to Embodiment 1 of the present disclosure.

TABLE 3

| | Cone coefficient | Aspheric surface coefficient | | | | | | |
|---|---|---|---|---|---|---|---|---|
| | k | A4 | A6 | A8 | A10 | A12 | A14 | A16 |
| R1 | 6.3383E−02 | 0.012018203 | −0.11349503 | 0.098359207 | 0.50307316 | −0.74614921 | −2.902062 | 3.9648254 |
| R2 | −2.8567E+03 | 0.030681638 | −0.06447553 | −0.37852174 | −0.49329056 | 0.46186492 | 1.0069815 | 0.067712381 |
| R3 | −3.7897E+03 | −0.00280083 | 0.3522508 | −0.81169635 | −1.2643281 | 1.5980185 | 4.8938984 | −4.5181549 |
| R4 | −6.9017E+00 | 0.045666975 | 0.19445508 | −0.12131568 | −0.09977777 | −0.012758139 | −0.47802679 | 1.7585613 |
| R5 | −2.4060E+01 | −0.26418217 | −0.21077384 | 0.41929847 | 0.42915399 | −0.37245897 | 0.15398034 | −1.0311082 |
| R6 | −2.2194E+02 | 0.007991468 | −0.5079363 | 0.6176746 | −0.30685532 | 0.40538927 | 0.022416477 | −0.25999124 |
| R7 | 1.6059E+00 | 0.079175421 | 0.15936776 | −0.35666035 | 0.004752286 | 0.24023805 | 0.099897432 | −0.18798391 |
| R8 | −3.4816E+00 | −0.15906306 | 0.27609838 | −0.0735578 | −0.01628842 | −0.010363449 | 1.01E−02 | −0.00242077 |
| R9 | 4.0815E+00 | −0.07848143 | 0.035733964 | 0.001596576 | −0.00180974 | 6.93E−05 | 2.35E−05 | 1.00E−06 |
| R10 | −1.0002E+01 | −0.10838764 | 0.050297073 | −0.01904356 | 0.004472995 | −0.000723816 | 7.57E−05 | −3.11E−06 |

Table 4 and Table 5 show the design data of inflection point and stationary point of each lens in the optical camera lens 10 according to Embodiment 1 of the present disclosure. R1, R2 respectively represent the object-side surface and the image-side surface of the first lens L1; R3, R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5. The data corresponding to the 'position of inflection point' column is the vertical distance from the inflection point disposed on each lens surface to the optical axis of the optical camera lens 10. The data corresponding to the 'position of stationary point' column is the vertical distance from the stationary point disposed on each lens surface to the optical axis of the optical camera lens 10.

TABLE 4

| | Number of inflection point | Position 1 of the inflection point | Position 2 of the inflection point | Position 3 of the inflection point |
|---|---|---|---|---|
| R1 | 0 | | | |
| R2 | 1 | 0.735 | | |
| R3 | 3 | 0.255 | 0.435 | 0.645 |
| R4 | 0 | | | |
| R5 | 1 | 0.235 | | |
| R6 | 2 | 0.305 | 0.705 | |
| R7 | 0 | | | |
| R8 | 2 | 0.655 | 1.065 | |
| R9 | 1 | 1.135 | | |
| R10 | 2 | 0.485 | 1.995 | |

TABLE 5

| | Number of the stationary point | Position 1 of the stationary point | Position 2 of the stationary point |
|---|---|---|---|
| R1 | 0 | | |
| R2 | 0 | | |
| R3 | 1 | 0.705 | |
| R4 | 0 | | |
| R5 | 1 | 0.395 | |
| R6 | 2 | 0.495 | 0.805 |
| R7 | 0 | | |
| R8 | 0 | | |
| R9 | 1 | 1.835 | |
| R10 | 1 | 1.115 | |

Figure 2:
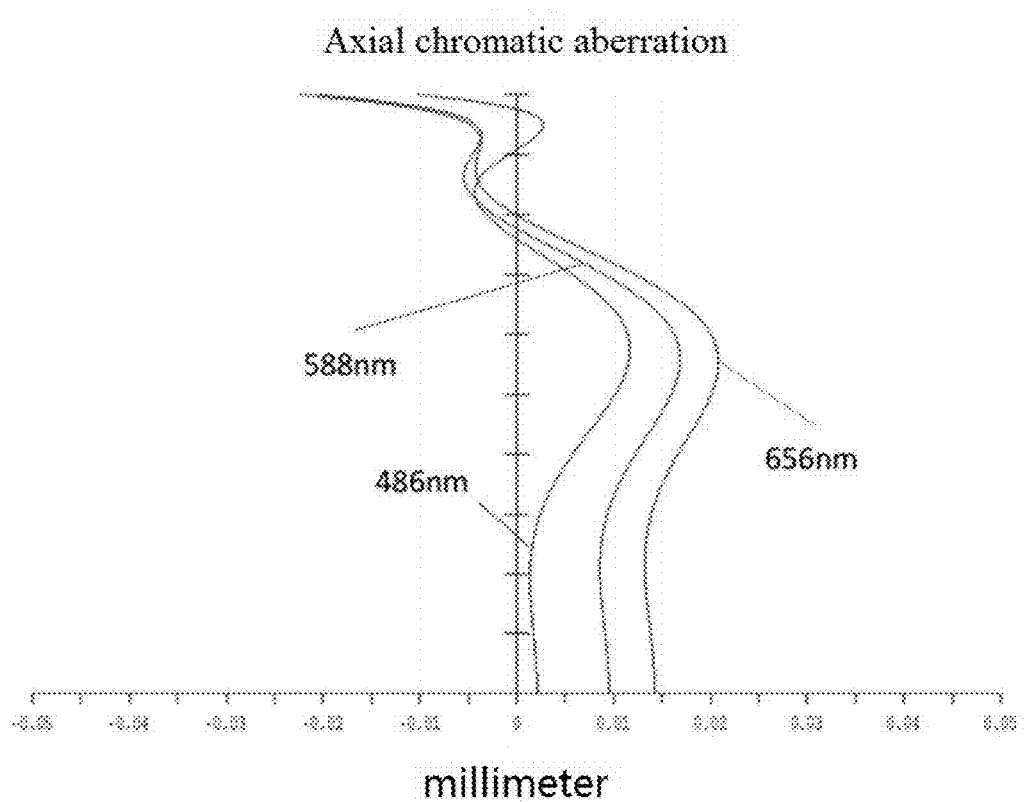
FIG. 2 is a schematic diagram of axial chromatic aberration of an optical camera lens shown in FIG. 1.
Figure 3:
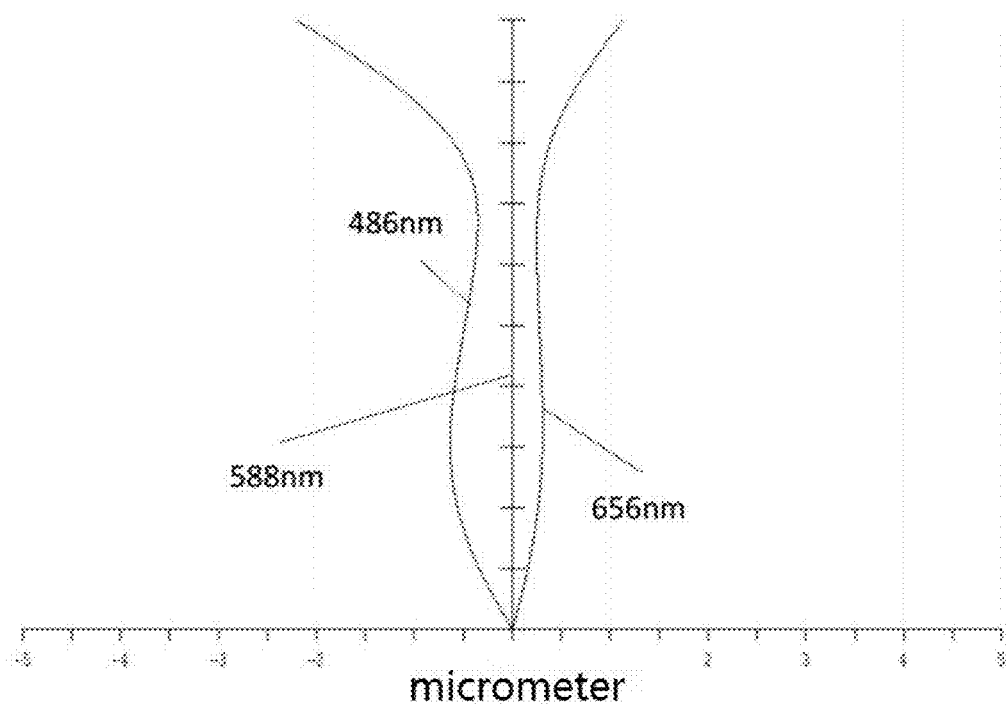
FIG. 3 is a schematic diagram of vertical axial chromatic aberration of an optical camera lens shown in FIG. 1.
Figure 4:
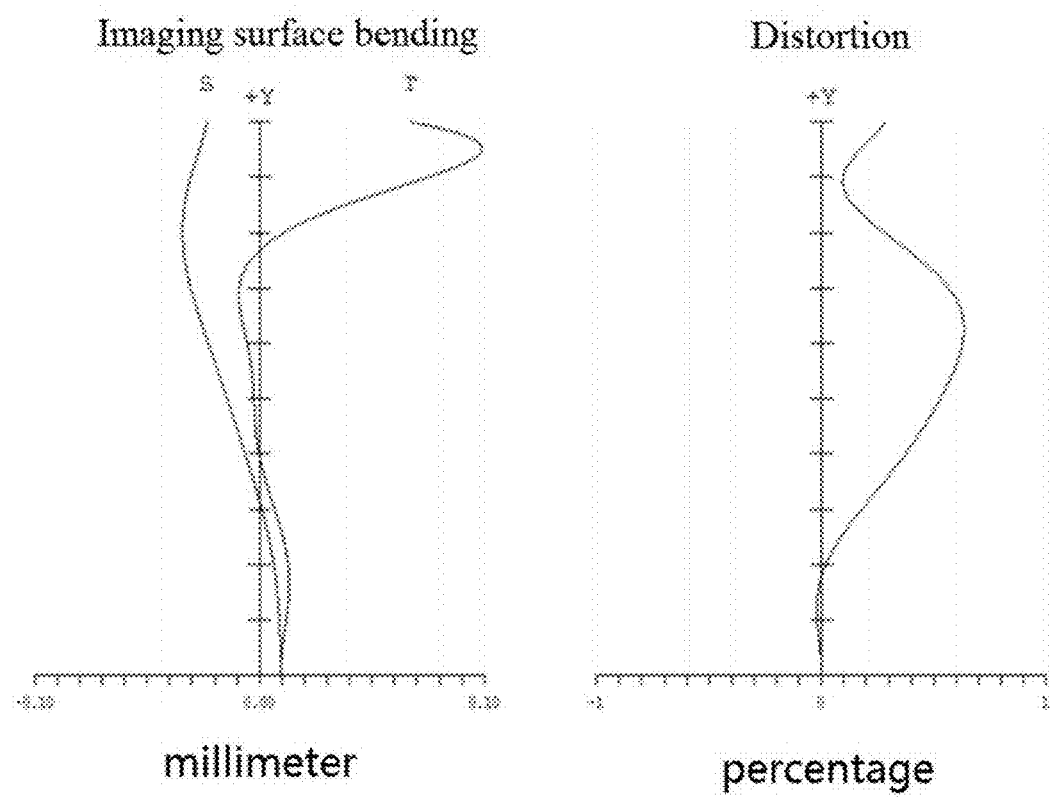
FIG. 4 is a schematic diagram of imaging surface bending and distortion of an optical camera lens shown in FIG. 1.

FIG. 2 and FIG. 3 respectively show the schematic diagram of the axial chromatic aberration and vertical axial chromatic aberration of the optical camera lens 10 according to Embodiment 1 after light with a respective wave length of 486 nm, 588 nm and 656 nm passing through the optical camera lens 10. FIG. 4 shows the schematic diagram of imaging surface bending and distortion of an optical camera lens 10 according to Embodiment 1.

The following table 6 lists values with respect to each conditional expression in Embodiment 1 according to the above conditional expressions. Obviously, the optical camera system of the present Embodiment 1 satisfies the above conditional expressions.

TABLE 6

| Conditions | Embodiment 1 |
|---|---|
| 53 < f3/f2 < 68 | 67.6841 |
| TTL/IH < 1.4 | 1.35638 |
| 0.95 < r5/r6 < 1.1 | 0.98891 |
| f3 > 200 | 268.695 |

In the present embodiment, the image height of full field of view of the optical camera lens is 2.495 mm, the field of view angle in the diagonal direction is 80.99°, the chief ray angle (Chief Ray Angle, CRA) of the largest field of view is 35.5°.

Figure 5:
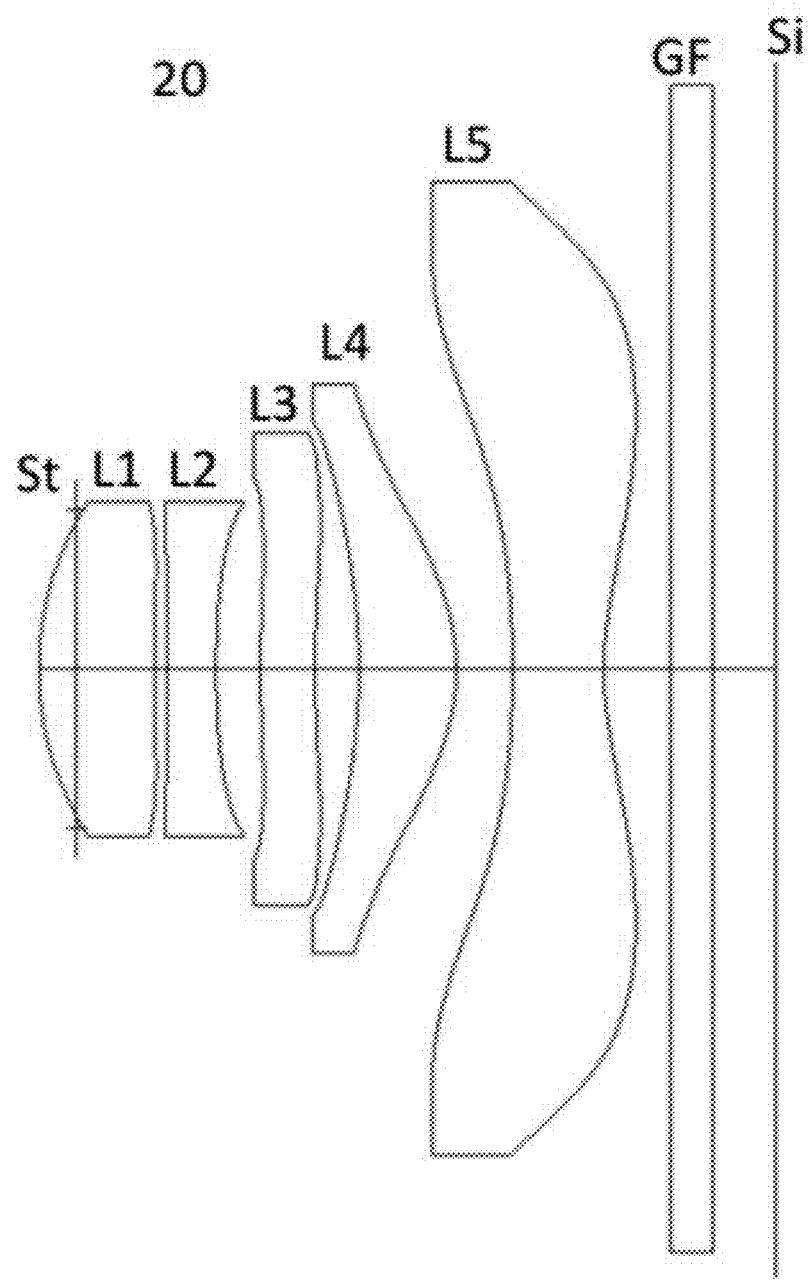
FIG. 5 is a structural schematic diagram of an optical camera lens according to another exemplary embodiment of the present disclosure.

FIG. 5 shows an optical camera lens 20 according to another exemplary embodiment of the present disclosure.

Table 7 and Table 8 show data of the lens in the optical camera lens 20 according to Embodiment 2 of the present disclosure.

TABLE 7

| Focal length (mm) | |
|---|---|
| f | 2.946914 |
| f1 | 2.946914 |
| f2 | −5.80587 |
| f3 | 204.3938 |
| f4 | 2.056257 |
| f5 | −1.73124 |
| f12 | 3.6965 | in which, meaning of each symbol is as follows.

f: focal length of the optical camera lens 10;
f1: focal length of the first lens L1;
f2: focal length of the second lens L2;
f3: focal length of the third lens L3;
f4: focal length of the fourth lens L4;
f5: focal length of the fifth lens L5;
f12: combined focal length of the first lens L1 and the second lens L2.

TABLE 8

| | | Curvature radius (R) (mm) | Thickness/ distance(d) (mm) | | Sagittal height (SAG) | Semi-diameter (SD) | Refractive index (nd) | Abbe number (vd) |
|---|---|---|---|---|---|---|---|---|
| St | St | ∞ | d0 = | −0.184 | | | | |
| L1 | R1 | 1.22036 | d1 = | 0.563 | SAG11  0.236 | 0.740 | nd1  1.5441 | v1  56.12 |
| | R2 | 10.25755 | d2 = | 0.057 | SAG12 −0.028 | 0.743 | | |
| L2 | R3 | −52.81967 | d3 = | 0.242 | SAG21 −0.005 | 0.740 | nd2  1.6510 | v2  21.51 |
| | R4 | 4.07802 | d4 = | 0.214 | SAG22  0.137 | 0.736 | | |
| L3 | R5 | 4.34023 | d5 = | 0.265 | SAG31 −0.027 | 0.831 | nd3  1.6510 | v3  21.51 |
| | R6 | 4.37864 | d6 = | 0.213 | SAG32 −0.034 | 1.040 | | |
| L4 | R7 | −2.46352 | d7 = | 0.474 | SAG41 −0.225 | 1.082 | nd4  1.5441 | v4  56.12 |
| | R8 | −0.82152 | d8 = | 0.273 | SAG42 −0.497 | 1.250 | | |

TABLE 8-continued

|  |  | Curvature radius (R) (mm) | Thickness/ distance(d) (mm) | Sagittal height (SAG) | Semi-diameter (SD) | Refractive index (nd) | Abbe number (vd) |
|---|---|---|---|---|---|---|---|
| L5 | R9 | −4.11152 | d9 = 0.442 | SAG51 −0.392 | 1.830 | nd5 1.5441 | v5 56.12 |
|  | R10 | 1.26817 | d10 = 0.324 | SAG52 −0.454 | 2.141 |  |  |
| GF | R11 | ∞ | d11 = 0.210 |  |  | nd6 1.5168 | v6 64.17 |
|  | R12 | ∞ | d12 = 0.305 |  |  |  |  |

R1, R2 are the object-side surface and the image-side surface of the first lens L1, respectively; R3, R4 are the object-side surface and the image-side surface of the second lens L2, respectively; R5, R6 are the object-side surface and the image-side surface of the third lens L3, respectively; R7, R8 are the object-side surface and the image-side surface of the fourth lens L4, respectively; R9, R10 are the object-side surface and the image-side surface of the fifth lens L5, respectively; R11, R12 are the object-side surface and the image-side surface of the optical filter GF, respectively. Meanings of other symbols are as follows.

d0: axial distance from the aperture St to the object-side surface of the first lens L1;

d1: axial thickness of the first lens L1;

d2: axial distance from the image-side surface of the first lens L1 to the object-side surface of the second lens L2;

d3: axial thickness of the second lens L2;

d4: axial distance from the image-side surface of the second lens L2 to the object-side surface of the third lens L3;

d5: axial thickness of the third lens L3;

d6: axial distance from the image-side surface of the third lens L3 to the object-side surface of the fourth lens L4;

d7: axial thickness of the fourth lens L4;

d8: axial distance from the image-side surface of the fourth lens L4 to the object-side surface of the fifth lens L5;

d9: axial thickness of the fifth lens L5;

d10: axial distance from the image-side surface of the fifth lens L5 to the object-side surface of the sixth lens L6;

d11: axial thickness of the optical filter GF;

d12: axial distance from the image-side surface of the optical filter GF to the imaging surface;

SAG: sagittal height, vertical distance between topmost point and bottommost point of the lens;

SAG11: sagittal height of the surface R1 of the first lens L1;

SAG12: sagittal height of the surface R2 of the first lens L1;

SAG21: sagittal height of the surface R3 of the second lens L2;

SAG22: sagittal height of the surface R4 of the second lens L2;

SAG31: sagittal height of the surface R5 of the third lens L3;

SAG32: sagittal height of the surface R6 of the third lens L3;

SAG41: sagittal height of the surface R7 of the fourth lens L4;

SAG42: sagittal height of the surface R8 of the fourth lens L4;

SAG51: sagittal height of the surface R9 of the fifth lens L5;

SAG52: sagittal height of the surface R10 of the fifth lens L5;

SD: semi-diameter parameter of the lens surface;

nd1: refractive index of the first lens L1;

nd2: refractive index of the second lens L2;

nd3: refractive index of the third lens L3;

nd4: refractive index of the fourth lens L4;

nd5: refractive index of the fifth lens L5;

nd6: refractive index of the optical filter GF;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the optical filter GF.

In the Embodiment 2 of the present disclosure, the distance from the image-side surface of the fifth lens L5 to the imaging surface Si is 0.839 mm, the TTL of the optical camera lens 20 is 3.581 mm.

Table 9 shows aspheric surface data of each lens in the optical camera lens 20 according to Embodiment 2 of the present disclosure.

TABLE 9

|  | Cone coefficient | Aspheric surface coefficient | | | | | | |
|---|---|---|---|---|---|---|---|---|
|  | k | A4 | A6 | A8 | A10 | A12 | A14 | A16 |
| R1 | 4.6350E−02 | 0.001014802 | −0.051181 | −0.03730085 | 0.25743639 | −0.19261579 | −1.3725781 | 1.1922845 |
| R2 | 1.8244E+02 | −0.09303302 | −0.15470323 | −0.0477 | −0.72970833 | −0.13316586 | 2.2234441 | −0.87394063 |
| R3 | −1.8424E+04 | −0.01742796 | 0.13434914 | −0.3968681 | −0.41286541 | 0.63088401 | 0.20625812 | 2.1323753 |
| R4 | 1.7310E+01 | 0.074368292 | 0.14696027 | 0.059565122 | 0.040576363 | −0.31942061 | −1.2567549 | 3.8951943 |
| R5 | −2.2864E+00 | −0.20359186 | −0.12128044 | 0.25136066 | 0.15898757 | −0.46733764 | 0.22776649 | −0.29758098 |
| R6 | −1.4306E+02 | 0.080306255 | −0.45903074 | 0.56533924 | −0.43711023 | 0.27126653 | −0.00880126 | −0.08126238 |
| R7 | 7.0727E−01 | 0.032416088 | 0.22096231 | −0.31472708 | −0.051828 | 0.15608987 | 0.12973329 | −0.12679565 |
| R8 | −3.4624E+00 | −0.20822347 | 0.28409523 | −0.07348884 | −0.00490802 | −0.016268482 | 1.87E−05 | 0.005015311 |

TABLE 9-continued

| | Cone coefficient | Aspheric surface coefficient | | | | | | |
|---|---|---|---|---|---|---|---|---|
| | k | A4 | A6 | A8 | A10 | A12 | A14 | A16 |
| R9 | 2.1794E+00 | −0.06515173 | 0.027189868 | 0.002480915 | −0.00160492 | 5.92E−05 | 3.11E−05 | −2.71E−06 |
| R10 | −9.9247E+00 | −0.10474205 | 0.049671105 | −0.01944718 | 0.004507844 | −0.000743005 | 7.70E−05 | −2.75E−06 |

Table 10 and Table 11 show the design data of inflection point and stationary point of each lens in the optical camera lens 20 according to Embodiment 2 of the present disclosure. R1, R2 respectively represent the object-side surface and the image-side surface of the first lens L1; R3, R4 respectively represent the object-side surface and the image-side surface of the second lens L2; R5, R6 respectively represent the object-side surface and the image-side surface of the third lens L3; R7, R8 respectively represent the object-side surface and the image-side surface of the fourth lens L4; R9, R10 respectively represent the object-side surface and the image-side surface of the fifth lens L5. The data corresponding to the 'position of inflection point' column is the vertical distance from the inflection point disposed on each lens surface to the optical axis of the optical camera lens 20. The data corresponding to the 'position of stationary point' column is the vertical distance from the stationary point disposed on each lens surface to the optical axis of the optical camera lens 20.

TABLE 10

| | Number of inflection point | Position 1 of the inflection point | Position 2 of the inflection point |
|---|---|---|---|
| R1 | 1 | 0.705 | |
| R2 | 2 | 0.285 | 0.715 |
| R3 | 1 | 0.635 | |
| R4 | 0 | | |
| R5 | 1 | 0.295 | |
| R6 | 1 | 0.395 | |
| R7 | 0 | | |
| R8 | 1 | 0.705 | |
| R9 | 1 | 1.175 | |
| R10 | 2 | 0.485 | 2.045 |

TABLE 11

| | Number of the stationary point | Position 1 of the stationary point |
|---|---|---|
| R1 | 0 | |
| R2 | 1 | 0.445 |
| R3 | 1 | 0.695 |
| R4 | 0 | |
| R5 | 1 | 0.515 |
| R6 | 1 | 0.645 |
| R7 | 0 | |
| R8 | 0 | |
| R9 | 0 | |
| R10 | 1 | 1.125 |

Figure 6:
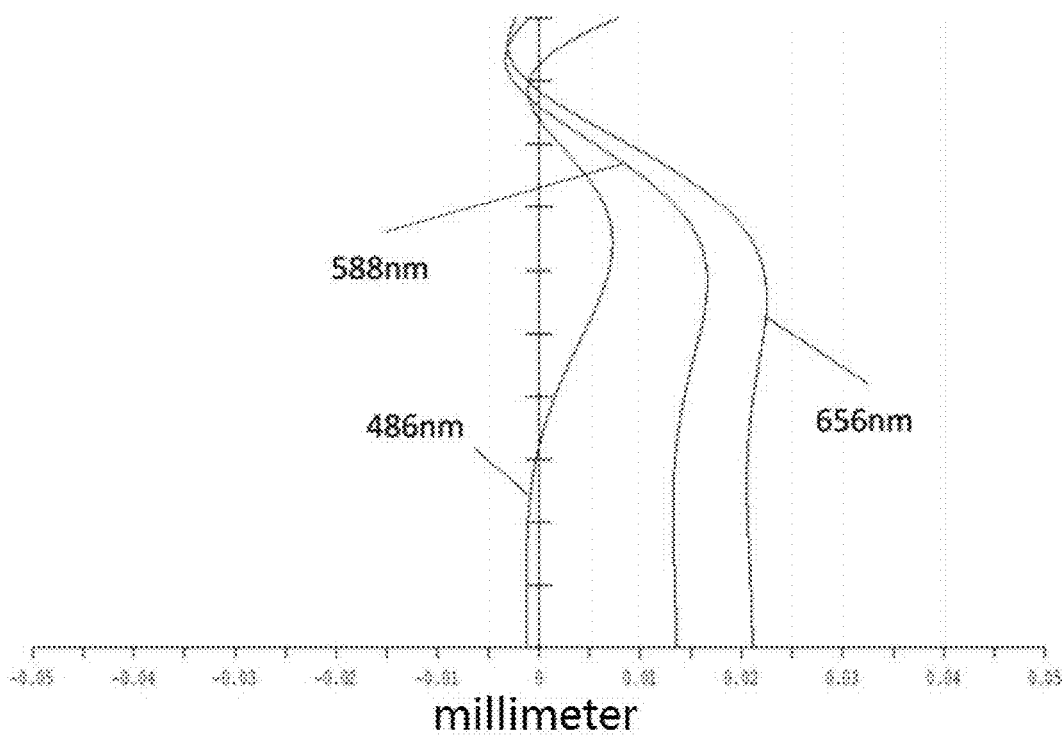
FIG. 6 is a schematic diagram of axial chromatic aberration of an optical camera lens shown in FIG. 5.
Figure 7:
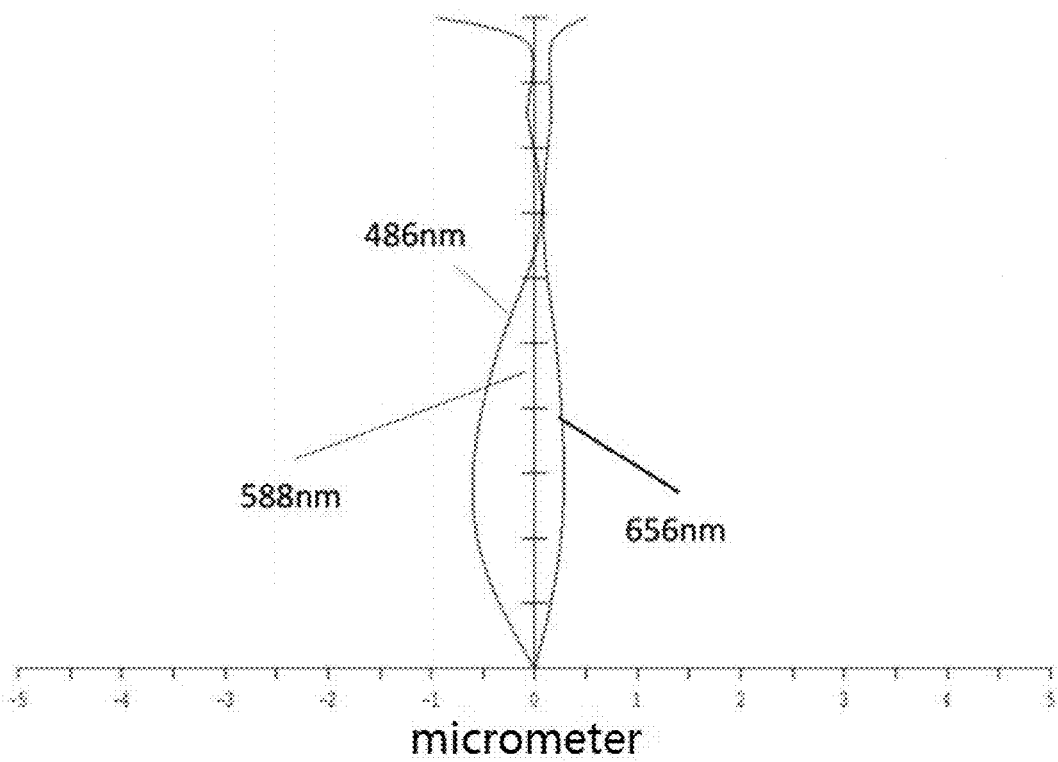
FIG. 7 is a schematic diagram of vertical axial chromatic aberration of an optical camera lens shown in FIG. 5.
Figure 8:
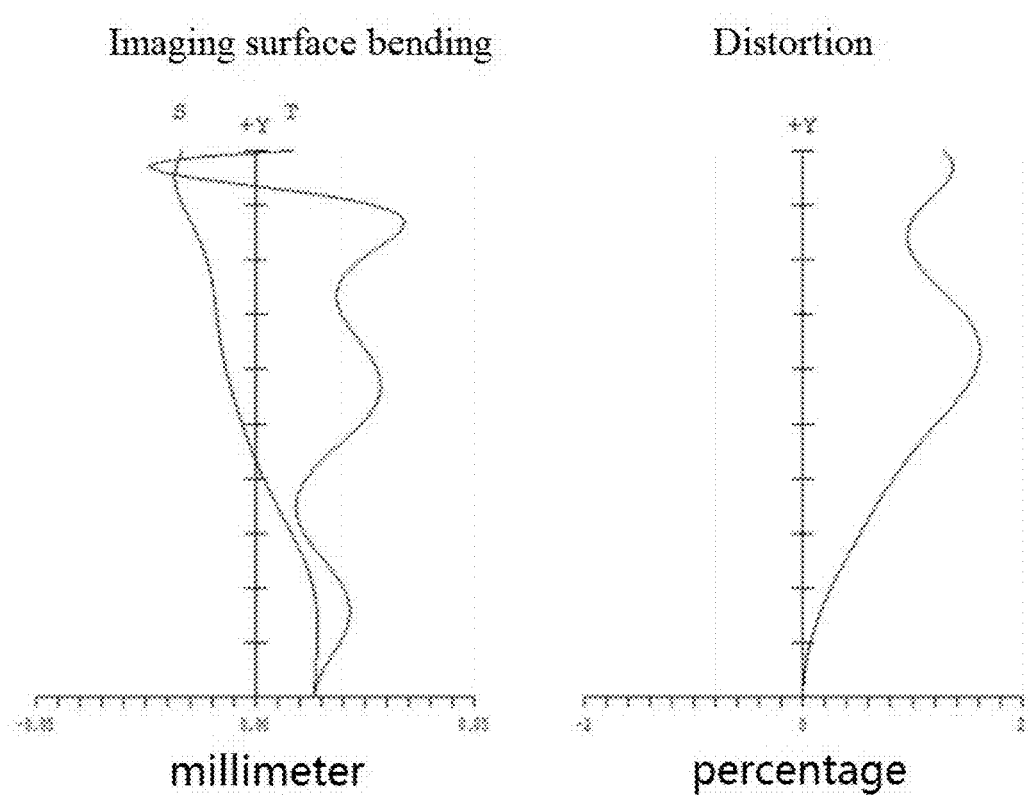
FIG. 8 is a schematic diagram of imaging surface bending and distortion of an optical camera lens shown in FIG. 5.

FIG. 6 and FIG. 7 respectively show the schematic diagram of the axial chromatic aberration and vertical axial chromatic aberration of the optical camera lens 20 according to Embodiment 2 after light with a respective wave length of 486 nm, 588 nm and 656 nm passing through the optical camera lens 10. FIG. 8 shows the schematic diagram of imaging surface bending and distortion of an optical camera lens 20 according to Embodiment 2.

The following table 12 lists values with respect to each conditional expression in the present embodiment 2 according to the above conditional expressions. Obviously, the optical camera system of the present Embodiment 2 satisfies the above conditional expressions.

TABLE 12

| Conditions | Embodiment 2 |
|---|---|
| 53 < f3/f12 < 68 | 55.2939 |
| TTL/IH < 1.4 | 1.35385 |
| 0.95 < r5/r6 < 1.1 | 0.99123 |
| f3 > 200 | 204.394 |

In the present embodiment, the image height of full field of view of the optical camera lens is 2.495 mm, the field of view angle in the diagonal direction is 80.51°, the chief ray angle (Chief Ray Angle, CRA) of the largest field of view is 35.4°.

Person skilled in the art shall understand, the above implementing manners are detailed embodiments of the present disclosure, however, in practical application, various modifications may be made to the forms and details thereof, without departing from the spirit and scope of the present disclosure.

What is claimed is:

1. An optical camera lens, from an object side to an image side, successively comprising:
   an aperture;
   a first lens having positive refraction power;
   a second lens having negative refraction power;
   a third lens having positive refraction power;
   a fourth lens having positive refraction power; and
   a fifth lens having negative refraction power;
   wherein a combined focal length of the first lens and the second lens is f12, a focal length of the third lens is f3, a total track length of the integral optical camera lens is TTL, an image height of the integral optical camera lens is IH, a curvature radius of an object-side surface of the third lens is r5, a curvature radius of an image-side surface of the third lens is r6, which satisfy following relational expressions:

$53 < f3/f12 < 68;$ $TTL/IH < 1.4;$ $0.95 < r5/r6 < 1.1;$ $f3 > 200.$

2. The optical camera lens as described in claim 1, wherein the focal length f1 of the first lens, the focal length f2 of the second lens, the focal length f3 of the third lens, the focal length f4 of the fourth lens and the focal length f5 of the fifth lens satisfy following relational expressions, respectively:

$2 \leq f1 < 3$;

$-4 \leq f2 < -6$;

$2 \leq f4 < 3$;

$-1 \leq f5 < -2$.

3. The optical camera lens as described in claim 1, wherein a refractive index n1 of the first lens, a refractive index n2 of the second lens, a refractive index n3 of the third lens, a refractive index n4 of the fourth lens and a refractive index n5 of the fifth lens satisfy following relational expressions, respectively:

$1.50 < n1 < 1.55$;

$1.50 < n2 < 1.55$;

$1.50 < n3 < 1.55$;

$1.60 < n4 < 1.70$;

$1.60 < n5 < 1.70$.

4. The optical camera lens as described in claim 1, wherein an abbe number v1 of the first lens, an abbe number v2 of the second lens, an abbe number v3 of the third lens, an abbe number v4 of the fourth lens and an abbe number v5 of the fifth lens satisfy following relational expressions, respectively:

$40 < v1 < 60$;

$15 < v2 < 30$;

$15 < v3 < 30$;

$40 < v4 < 60$;

$40 < v5 < 60$.

* * * * *